US008084734B2

(12) United States Patent
Vertes et al.

(10) Patent No.: US 8,084,734 B2
(45) Date of Patent: Dec. 27, 2011

(54) LASER DESORPTION IONIZATION AND PEPTIDE SEQUENCING ON LASER INDUCED SILICON MICROCOLUMN ARRAYS

(75) Inventors: Akos Vertes, Reston, VA (US); Yong Chen, San Diego, CA (US)

(73) Assignee: The George Washington University, Washington, DC (US)

( * ) Notice: Subject to any disclaimer, the term of this patent is extended or adjusted under 35 U.S.C. 154(b) by 1079 days.

(21) Appl. No.: 11/674,671

(22) Filed: Feb. 14, 2007

(65) Prior Publication Data

US 2009/0321626 A1    Dec. 31, 2009

Related U.S. Application Data

(60) Provisional application No. 60/808,544, filed on May 26, 2006.

(51) Int. Cl.
    H01J 49/04    (2006.01)
    H01J 49/16    (2006.01)
(52) U.S. Cl. .................................. 250/288; 250/282
(58) Field of Classification Search .................. 250/288; 219/121.7
    See application file for complete search history.

(56) References Cited

U.S. PATENT DOCUMENTS

| | | | |
|---|---|---|---|
| 6,288,390 B1 | 9/2001 | Suizdak et al. | |
| 6,589,485 B2 | 7/2003 | Koster | |
| 6,794,196 B2 | 9/2004 | Fonash et al. | |
| 6,846,681 B2 | 1/2005 | Buriak et al. | |
| 6,881,950 B2 | 4/2005 | Schlaf et al. | |
| 6,958,480 B1 | 10/2005 | Iyer et al. | |
| 6,995,363 B2 | 2/2006 | Donegan et al. | |
| 7,045,366 B2 | 5/2006 | Huang et al. | |
| 7,049,583 B2 | 5/2006 | Bateman et al. | |
| 7,057,165 B2 | 6/2006 | Koopman et al. | |
| 7,112,453 B2 | 9/2006 | Hutchens et al. | |
| 7,354,792 B2 * | 4/2008 | Carey et al. | 438/95 |
| 7,442,629 B2 * | 10/2008 | Mazur et al. | 438/487 |
| 2001/0031409 A1 | 10/2001 | Sasaki et al. | |
| 2002/0000516 A1 | 1/2002 | Schultz et al. | |
| 2002/0042112 A1 | 4/2002 | Koster et al. | |
| 2002/0060290 A1 | 5/2002 | Pham | |
| 2002/0150903 A1 | 10/2002 | Koster | |
| 2002/0190203 A1 | 12/2002 | Valaskovic et al. | |

(Continued)

FOREIGN PATENT DOCUMENTS

WO    WO 98/20020    5/1998

(Continued)

OTHER PUBLICATIONS

Cuiffi et al., "Desorption-Ionization Mass Spectrometry Using Deposited Nanostructured Silicon Films", Analytical Chemistry, vol. 73, No. 6, Mar. 15, 2001, pp. 1292-1295.*

(Continued)

*Primary Examiner* — Jack Berman
(74) *Attorney, Agent, or Firm* — Blank Rome LLP

(57) ABSTRACT

The present invention provides a method of producing a laser-patterned silicon surface, especially silicon wafers for use in laser desorption ionization (LDI-MS) (including MALDI-MS and SELDI-MS), devices containing the same, and methods of testing samples employing the same. The surface is prepared by subjecting a silicon substrate to multiple laser shots from a high-power picosecond or femtosecond laser while in a processing environment, e.g., underwater, and generates a remarkable homogenous microcolumn array capable of providing an improved substrate for LDI-MS.

8 Claims, 14 Drawing Sheets

U.S. PATENT DOCUMENTS

Figure 1A:
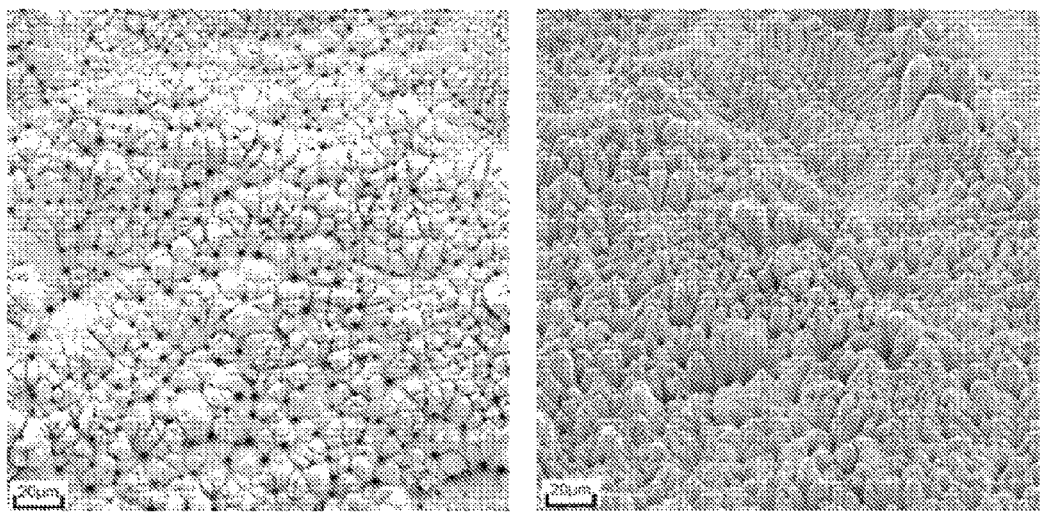

| | | |
|---|---|---|
| 2003/0017464 A1 | 1/2003 | Pohl et al. |
| 2003/0032043 A1 | 2/2003 | Pohl et al. |
| 2003/0080290 A1 | 5/2003 | Baranov et al. |
| 2003/0082609 A1 | 5/2003 | Olek et al. |
| 2003/0096426 A1 | 5/2003 | Little et al. |
| 2003/0113750 A1 | 6/2003 | Distler et al. |
| 2003/0119021 A1 | 6/2003 | Koster et al. |
| 2003/0119025 A1 | 6/2003 | Olek et al. |
| 2003/0124371 A1 | 7/2003 | Um et al. |
| 2003/0129589 A1 | 7/2003 | Koster et al. |
| 2003/0129620 A1 | 7/2003 | Olek et al. |
| 2003/0139885 A1 | 7/2003 | Brock et al. |
| 2003/0143493 A1 | 7/2003 | Schultz et al. |
| 2003/0143606 A1 | 7/2003 | Olek et al. |
| 2003/0148326 A1 | 8/2003 | Olek et al. |
| 2003/0148327 A1 | 8/2003 | Olek et al. |
| 2003/0148528 A1 | 8/2003 | Hillenkamp |
| 2003/0157510 A1 | 8/2003 | Olek et al. |
| 2003/0162194 A1 | 8/2003 | Olek et al. |
| 2003/0173513 A1 | 9/2003 | Koopmann et al. |
| 2003/0186277 A1 | 10/2003 | Olek et al. |
| 2003/0215842 A1 | 11/2003 | Sledziewski et al. |
| 2003/0218127 A1 | 11/2003 | Schlaf et al. |
| 2003/0228594 A1 | 12/2003 | Koster |
| 2003/0228639 A1 | 12/2003 | Wright et al. |
| 2004/0018519 A1 | 1/2004 | Wright, Jr. |
| 2004/0023230 A1 | 2/2004 | Olek et al. |
| 2004/0029121 A1 | 2/2004 | Cottrell et al. |
| 2004/0029123 A1 | 2/2004 | Olek et al. |
| 2004/0029128 A1 | 2/2004 | Cottrell et al. |
| 2004/0048254 A1 | 3/2004 | Olek et al. |
| 2004/0067491 A1 | 4/2004 | Olek et al. |
| 2004/0076956 A1 | 4/2004 | Olek et al. |
| 2004/0079874 A1 | 4/2004 | Bateman et al. |
| 2004/0079880 A1 | 4/2004 | Bateman et al. |
| 2004/0096917 A1 | 5/2004 | Ivey et al. |
| 2004/0115630 A1 | 6/2004 | Olek et al. |
| 2004/0142334 A1 | 7/2004 | Schacht |
| 2004/0157242 A1 | 8/2004 | Ivey et al. |
| 2004/0173743 A1 | 9/2004 | Valaskovic et al. |
| 2004/0219549 A1 | 11/2004 | Distler et al. |
| 2004/0228772 A1 | 11/2004 | Chen et al. |
| 2004/0234973 A1 | 11/2004 | Adorjan et al. |
| 2004/0238754 A1 | 12/2004 | Baranov et al. |
| 2004/0241651 A1 | 12/2004 | Olek et al. |
| 2004/0245450 A1 | 12/2004 | Hutchens et al. |
| 2005/0023456 A1 | 2/2005 | Frechet et al. |
| 2005/0042771 A1 | 2/2005 | Koster et al. |
| 2005/0064401 A1 | 3/2005 | Olek et al. |
| 2005/0064410 A1 | 3/2005 | Distler et al. |
| 2005/0112650 A1 | 5/2005 | Chang et al. |
| 2005/0123939 A1 | 6/2005 | Gorenstein et al. |
| 2005/0164402 A1 | 7/2005 | Belisle et al. |
| 2005/0202420 A1 | 9/2005 | Berlin |
| 2005/0255606 A1 | 11/2005 | Ahmed et al. |
| 2005/0282157 A1 | 12/2005 | Olek et al. |
| 2006/0024720 A1 | 2/2006 | McLean et al. |
| 2006/0043285 A1 | 3/2006 | Laskin et al. |
| 2006/0051879 A9 | 3/2006 | Koster et al. |
| 2006/0088830 A1 | 4/2006 | Wright, Jr. et al. |
| 2006/0121489 A1 | 6/2006 | Gorenstein et al. |
| 2006/0151688 A1 | 7/2006 | Castro-Perez et al. |
| 2006/0157647 A1 | 7/2006 | Suizdak et al. |
| 2006/0157648 A1 | 7/2006 | Suizdak et al. |
| 2006/0159916 A1 | 7/2006 | Dubrow et al. |
| 2006/0192107 A1 | 8/2006 | DeVoe et al. |
| 2006/0234269 A1 | 10/2006 | Asplund et al. |
| 2006/0252159 A1 | 11/2006 | Huang et al. |
| 2006/0270062 A1 | 11/2006 | Nelson et al. |
| 2006/0292701 A1 | 12/2006 | Huang et al. |
| 2007/0023627 A1 | 2/2007 | Finch et al. |
| 2007/0023682 A1 | 2/2007 | Benevides |

FOREIGN PATENT DOCUMENTS

| | | |
|---|---|---|
| WO | WO 98/20166 | 5/1998 |
| WO | WO 99/57318 | 11/1999 |
| WO | WO 00/54309 | 9/2000 |
| WO | WO 01/50499 | 7/2001 |
| WO | WO 01/71326 | 9/2001 |
| WO | WO 02/093170 | 11/2002 |
| WO | WO 02/095362 | 11/2002 |
| WO | WO 03/025973 | 3/2003 |
| WO | WO 2003/054543 | 3/2003 |
| WO | WO 03/040700 | 5/2003 |
| WO | WO 2003/079402 | 5/2003 |
| WO | WO 2003/092581 | 5/2003 |
| WO | WO 03/052135 | 6/2003 |
| WO | WO 2004/064972 | 4/2004 |
| WO | WO 2004/076511 | 4/2004 |
| WO | WO 2004/099068 | 5/2004 |
| WO | WO 2005/001423 | 1/2005 |
| WO | WO 2005/017487 | 1/2005 |
| WO | WO 2005/022583 | 2/2005 |
| WO | WO 2005/029003 | 2/2005 |
| WO | WO 2005/070089 | 3/2005 |
| WO | WO 2005/081722 | 4/2005 |
| WO | WO 2005/088293 | 4/2005 |
| WO | WO 2006/083151 | 8/2006 |
| WO | WO 2006/113785 | 10/2006 |

OTHER PUBLICATIONS

Trauger et al., "High Sensitivity and Analyte Capture with Desorption/Ionization Mass Spectrometry on Silylated Porous Silicon", Analytical Chemistry, vol. 76, No. 15, Aug. 1, 2004, pp. 4484-4489.*

Stockle et al., Nanoscale Atmospheric Pressure Laser Ablation-Mass Spectrometry, Analytical Chemistry, 2001, vol. 73, No. 7, pp. 1399-1402.

Coon et al., Laser-Desorption-Atmospheric Pressure Checmical Ionization Mass Spectrometry for the Analysis of Peptides from Aqueous Solution Analytical Chemistry, Nov. 1, 2002, vol. 74, No. 21, pp. 5600-5605.

Rasmussen et al., New Dimension in Nano-Imaging: BreaKing Through the Diffraction Limit with Scanning Near-Field Optical Microscopy, Anal Bioanal Chem, 2005, vol. 381, pp. 165-172.

Takubo Kenji, Ionizing Device and Mass Spectrometer Using the Same.

Huang, Min-Zong, et. al., Direct Protein Detection from Biological Media through Electrospray Assisted Laser Desorption Ionization/Mass Spectrometry, Journal of Proteome Research, vol. 5, No. 5, 2006, pp. 1107-1116.

Takats, Zoltan, et. al., Mass Spectrometry Sampling Under Ambient Conditions with Desorption Electrospray Ionization, Science Magazine, vol. 306, Oct. 15, 2004, pp. 471-473.

Cody, Robert B., et. al., Versatile New Ion Source for the Analysis of Materials in Open Air under Ambient Conditions, Analytical Chemistry, vol. 77, No. 8, Apr. 15, 2005, pp. 2297-2302.

Figure 5:
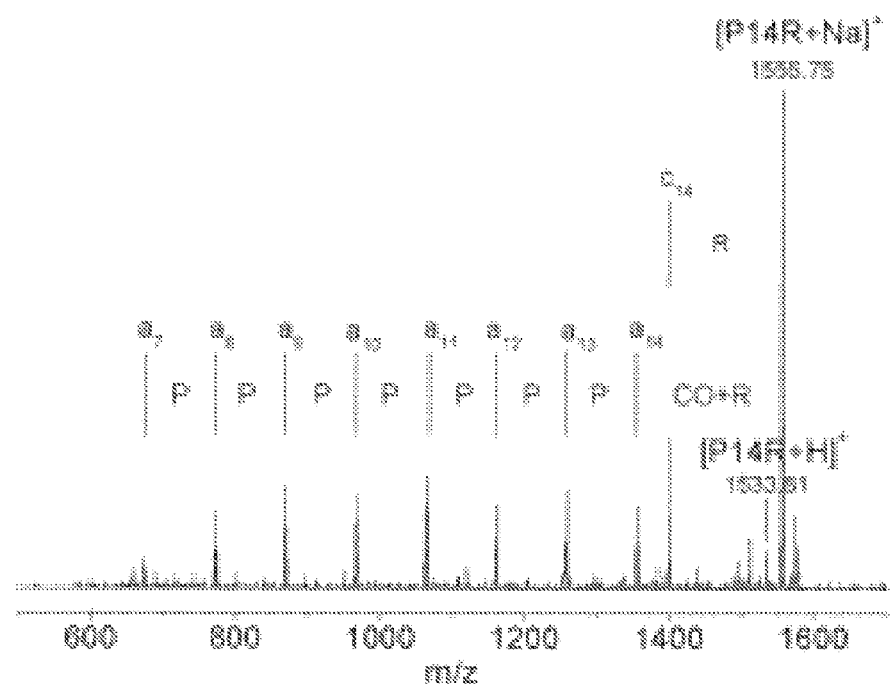
Figure 6:
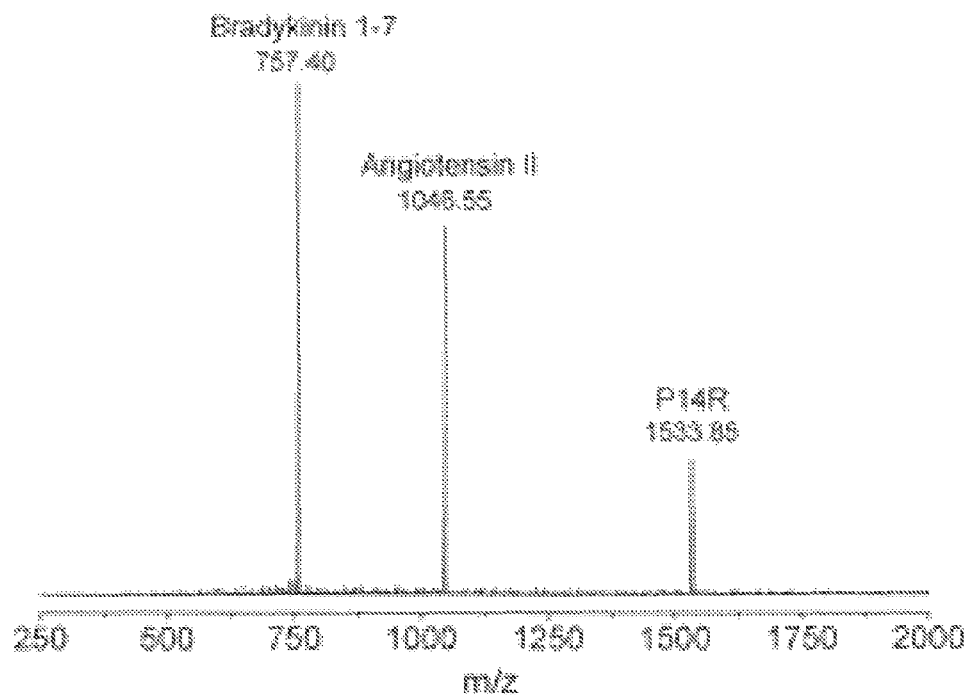

* cited by examiner figure 5 Peptide P14R spectrum shows fragmentation from in-source decay at laser power 85 (arbitrary units). Complete peptide sequence information can be discerned from spectrum.

figure 6  Mass spectrum of intact bradykinin, angiotensin II, and P14R. Demonstrates the capability of the invention to analyze mixtures of peptides. This is essential in peptide mapping, a central method in proteomics.

LASER DESORPTION IONIZATION AND PEPTIDE SEQUENCING ON LASER INDUCED SILICON MICROCOLUMN ARRAYS

PRIORITY CLAIM

This application claim the benefit under 119(e) of U.S. Provisional 60/808,544, filed May 26, 2006.

STATEMENT OF GOVERNMENTAL INTEREST

The U.S. Government has an interest in this invention by virtue of a grant from the Department of Energy (Grant # DE-FG02-01 ER15129).

FIELD OF THE INVENTION

The field of the invention is laser desorption ionization (LDI) mass spectrometry (MS).

BACKGROUND

Laser desorption ionization (LDI) based on laser-induced silicon microcolumn arrays was developed for mass spectrometry (MS) of biomolecules and other natural and synthetic products. The technique enables one to obtain intact molecular mass at low laser power and structural information (such as, e.g., peptide sequence) from in-source decay (ISD) and/or post-source decay (PSD) at high laser power. It can be used for small molecule analysis and peptide sequencing without using matrix molecules required for matrix-assisted laser desorption ionization (MALDI) or surface enhanced laser desorption ionization (SELDI).

SUMMARY

In one preferred embodiment, a process for manufacturing a laser-induced silicon microcolumn surface is provided, comprising: subjecting a silicon surface in an appropriate processing environment to repeated pulsed high-power picosecond laser irradiation, wherein an array of microcolumns is generated on the silicon surface and the microcolumns have an average height and periodicity of less than about 10 micrometers.

In additional preferred embodiments, a process is provided wherein the microcolumns have structural features (such as column height, diameter and periodicity) of less than about 1 micrometer, or alternatively wherein the appropriate processing environment is selected from the group consisting of a gas (e.g., air or $SF_6$) environment, or alternatively, wherein the processing environment is a liquid (e.g., water or aqueous solution) environment.

Further preferred embodiments, provide wherein the repeated pulsed high-power picosecond or femtosecond laser irradiation (e.g., 22 picosecond pulses) comprises less than about a few thousand laser shots, e.g. less than about 1200.

Another preferred embodiment provides a laser patterned surface made according to any of the processes described herein.

Another preferred embodiment provides a LDI-MS system which comprises a laser patterned surface made according to the process herein.

A further preferred embodiment provides a method of detecting the components of a sample, comprising: subjecting a sample to LDI-MS, wherein the components are selected from the group consisting of proteins, peptides, pharmaceuticals, explosives, synthetic polymers, and molecules having a molecular weight less than about 6000 Daltons, and wherein the LDI-MS is performed using a LDI-MS device which comprises a laser patterned surface made according to the process herein.

Another preferred embodiment provides a silicon wafer for use in a microfluidic sample preparation platform, comprising: a low-resistivity silicon wafer having an array of microcolumns with average structural features of about less than 1 micrometer.

Additional preferred embodiments provide a low-resistivity silicon wafer having an array of microcolumns with average structural features of about less than 1 micrometer, wherein the low-resistivity silicon wafer is a p-type silicon wafer, or wherein the array of microcolumns is a substantially homogenous area of submicron columns and submicron troughs, or wherein the sample is selected from the group consisting of proteins, peptides, pharmaceuticals, explosives, synthetic polymers, and molecules having a molecular weight less than about 6000 Daltons.

FIGURE CAPTIONS

FIG. 1 Top (left panels) and side (right panels) views of silicon microcolumn arrays produced (A) in ambient air with 1000 laser shots at 1 $J/cm^2$, (B) in $SF_6$ gas at 1 atm pressure with 1200 laser shots at 0.4 $J/cm^2$ and (C) in water with 600 laser shots at 0.13 $J/cm^2$. Bottom panels show cross sectional view.

FIG. 2 (A) Reflectron mass spectrum of bradykinin fragment 1-7, angiotensin II and P14R mixture, 1 pmol each, at relative laser power 60. (B) With increase in laser power, P14R alkali (particularly sodium) adducts become dominant in spectrum.

FIG. 3 (A) Mass spectrum of 0.1 µg PPG1000 at relative laser power 135 with no low-mass cutoff. All PPG peaks are sodiated and n16 stands for degree of polymerization n=16. Inset indicates a 10× magnified marginal signal from alkali and other metal ions in low-mass region. (B) Mass spectrum of 0.1 µg PEG400 at relative power 125. Major peaks are sodiated PEG molecules, whereas asterisks indicate potassium adducts.

FIG. 4 (A) ISD spectrum of 1 pmol P14R on silicon microcolumn array at relative laser power 85. R and P stand for arginine and proline residues. Sodiated N-terminal fragment ions (a-type and c-type) are observed. (B) PSD spectrum of 1 pmol P14R in α-cyano-hydroxycinnamic acid (CHCA) matrix at relative laser power 100. Protonated y-type ions are observed. Asterisks mark the y-type ions with ammonia loss. (C) Isotopic profiles of P14R ISD fragment ions: (a) a10, (b) a11, (c) a12, (d) c14, (e) molecular ion [M+Na]+ at relative laser power 85, and (f) molecular ion [M+H]+ at relative laser power 60. Asterisks mark the monoisotopic peak in each profile and neighboring peaks are 1 Da apart.

FIG. 5 Peptide P14R spectrum shows fragmentation from in-source decay at laser power 85 (arbitrary units). Complete peptide sequence information can be discerned from spectrum.

FIG. 6 Mass spectrum of intact bradykinin, angiotensin II, and P14R. Demonstrates the capability of the invention to analyze mixtures of peptides. This is essential in peptide mapping, a central method in proteomics.

Figure 7:
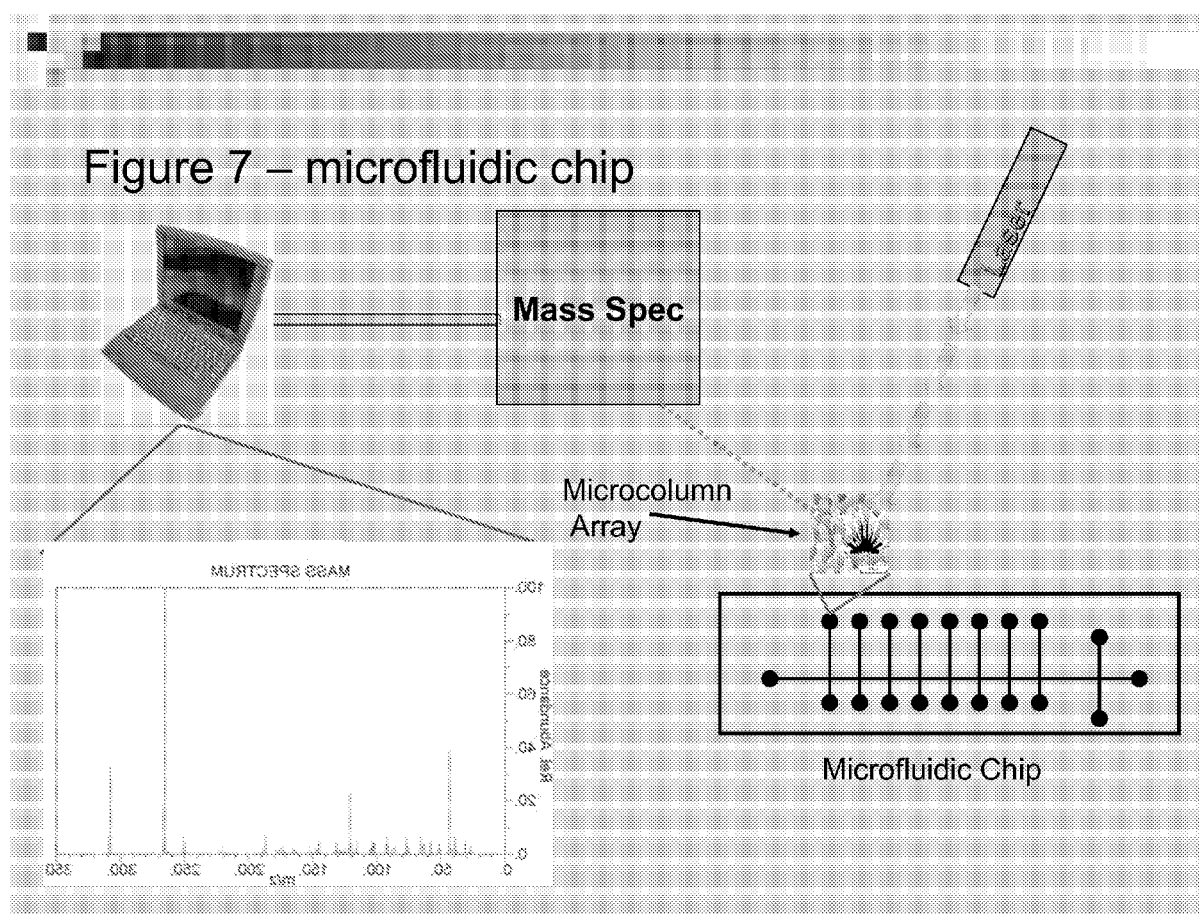

FIG. 7 Microfluidic embodiment. Benefit of SLDI is unintrusive preparation and reusability. Also, this embodiment provides for analysis and determination of small molecule fragmentation and the definitive identification of small molecules. Furthermore, the ability to integrate onto surfaces for manufacture of microfluidic devices and chip-based devices is provided.

Figure 8:
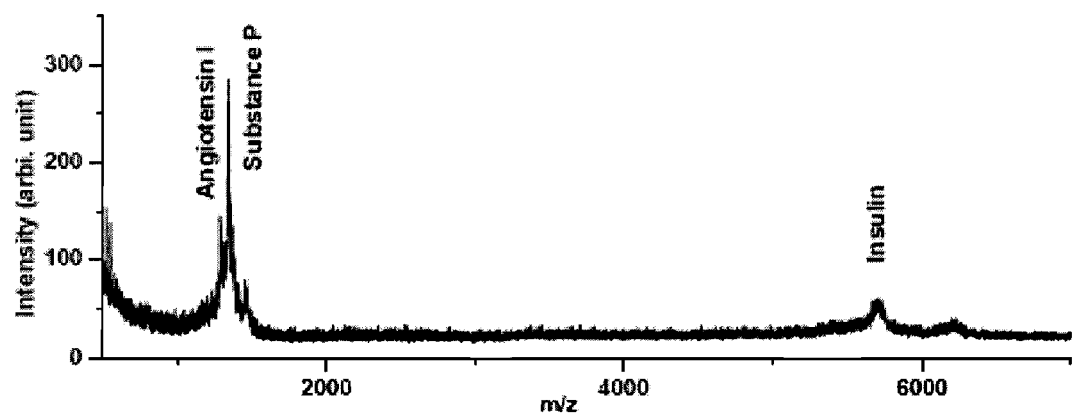

FIG. 8 is an SLDI mass spectrum of a peptide mixture containing angiotensin I, substance P and insulin from a LISMA surface.

DETAIL DESCRIPTION

Laser desorption ionization mass spectrometry is a key method in the analysis of large biomolecules. One goal is to efficiently produce ions from the molecules deposited on the surface of a substrate with minimal or controlled amount of fragmentation. It is also essential that the composition of the produced ions reflect the composition of the sample on the surface. In recent years, various methods of soft laser desorption ionization (SLDI) have been developed to achieve this goal. The most successful version of the method, matrix-assisted laser desorption ionization (MALDI), has been demonstrated for different laser wavelengths (UV and IR) and various laser pulse lengths (ns, ps and fs pulses). Combined with mass spectrometry MALDI is capable of identifying biomolecules of moderate to large size (i.e., m/z 1,000 to 100,000). The presence of the organic matrix in MALDI, however, creates an obstacle in the analysis of small molecules, essential in a large number of applications (e.g., pharmaceuticals).

In contrast to the conventional MALDI MS, matrix molecules are not needed in this technique. Instead, the silicon array surface can directly desorb and ionize the analyte upon pulsed laser irradiation. This simplifies the sample preparation and eliminates mass spectral interferences from the matrix molecules. Also, at high laser power, the technique enables much more efficient in-source decay than MALDI and generates peptide fragment ions for peptide sequencing. Further, the silicon microcolumn arrays can be generated on polished silicon surfaces by repeated exposure to a focused pulsed laser beam without complex chemical processes, thus, they can be easily integrated into lab-on-a-chip devices.

It is contemplated that the invention has immediate application to drug discovery, biomedical testing, environmental monitoring, forensics analysis and homeland security applications.

The range of mass is preferably limited to <6000 Da. This mass range, however, is sufficient for many important applications, including all the applications mentioned. It is also contemplated as within the scope of the invention to extend the mass range by surface modification of the silicon substrate with silylating reagents.

It is important that the subject matter of the invention is concerned with a method to produce a surface of certain morphology by laser exposure and use that surface for laser desorption ionization mass spectrometry, but that the surface need not be chemically modified; rather chemical modification is an option.

A production method based on pulsed laser irradiation of silicon surfaces in an appropriate processing environment (e.g., underwater). This method is simple (one step), robust, rapid and in its simplest form it does not require separate chemical processing steps. The substrate is not porous or mesoporous and can be best described as an array of columns protruding from the surface. The method is capable of obtaining molecular weight information at low laser irradiance and more complete structural information based on in-source and/or post-source decay at elevated laser irradiance. The instrumentation for in-source decay is inherent in every mass spectrometer, whereas post source decay requires special mass spectrometers. For example, in the case of time-of-flight mass spectrometers they need to be equipped with an ion reflectron.

Generally, the inventive subject matter provides a physical process that involves laser heating, deformation, fast cooling. Intense heating causes the melting and deformation of the surface when a high power laser is used to irradiate the silicon wafer; and fast cooling and/or chemical modification by the processing medium, e.g. water, in which the silicon is submerged help freeze the deformation, resulting in ubiquitous protrusions in the form of microcolumns within the laser irradiation area.

The laser-induced silicon microcolumn array substrate consists of numerous submicron-size individual microcolumns that protrude from the surface. Thus, when the sample is applied on the substrate, the molecules are absorbed on the surfaces of the microcolumns and the valleys between the columns. The laser-induced microcolumn arrays can desorb and ionize intact analyte molecules at low laser irradiance, but also induce structure-specific fragment ions at high laser irradiance. The molecular ion signals can be used, e.g., for peptide mapping, whereas the fragment ion signals are essential for peptide sequencing in proteomics research.

Accordingly, the technology herein provides an alternative surface structure with nanoscopic features that are sufficiency robust for SLDI applications. It is shown herein that repeated exposure of a polished silicon surface to laser pulses could produce two-dimensional arrays of protrusions on silicon surface. These structures are called laser-induced microcolumn arrays (LISMA) hereon. The periodicity, thickness, height, and the radius of tip curvature for these microcolumns can vary with the environment in which the target was irradiated and with the laser pulse length, applied fluence and the number of laser pulses. In a remarkable departure from unstructured silicon that is transparent to below-bandgap radiation (>1.1 µm), the microcolumn arrays demonstrate close-to unity absorptance from near UV (>250 nm) to near IR (<2.5 µm). The new surface morphology and optoelectronic properties of these microstructured surfaces make the laser-induced silicon microcolumn arrays a promising candidate for SLDI-MS.

Silicon-based lab-on-a-chip techniques enabled the rapid and automated separation and identification of proteins and other organic molecules. As the laser irradiation process we use to produce the silicon microcolumn arrays does not involve lengthy chemical etching with corrosive reagents, these surfaces can be easily integrated into microfluidics-based analytical systems for integrated SLDI-MS. In principle, used microcolumn surfaces can also be regenerated by additional processing with laser radiation.

Accordingly, it is demonstrated that ps laser irradiation can also be used to produce microcolumn arrays on silicon and that the resulting structures are efficient SLDI substrates for small molecule mass spectrometry. The array properties, such as periodicity, column thickness and height and the radius of tip curvature, were changed by varying the environment and the parameters in laser 5 processing. This also enables the ability to vary the dependence of SLDI yields on the surface morphology and to use silicon microcolumn arrays in inducing structure-specific fragmentation at elevated laser fluence.

EXPERIMENTAL

Materials

Single side polished mechanical grade, low resistivity (~0.001-0.005·cm) p-type silicon wafers (Si:B <100>, 280±20 µm in thickness) were purchased from University Wafer (South Boston, Mass.). Ambient air, deionized water (18.2 M cm), and sulfur hexafluoride gas (Spectra Gases, Inc., Branchburg, N.J.) were used as background media during laser microstructuring. A peptide and protein MALDI-MS calibration kit (MSCAL1), HPLC grade substance P, angiotensin I, bovine insulin, ethanol, methanol, and reagent grade 2,5-dihydroxybenzoic acid (DHB) and α-cyano-4-hydroxycinnamic acid (CHCA) were obtained from Sigma Chemical Co. (St. Louis, Mo.). Reagent grade trifluoroacetic acid (TFA) was obtained from Aldrich (Milwaukee, Wis.). Acetonitrile solvent (HPLC grade) was purchased from Fisher Scientific (Springfield, N.J.). Polypropylene Glycol (PPG1000, average molecular weight=1000) and polyethylene glycol (PEG400, average molecular weight=400) were obtained from American Polymer Standards Corp (Mentor, Ohio) and Sigma Chemical Co. (St. Louis, Mo.), respectively.

Preparation of Silicon Microcolumn Arrays.

Silicon wafers were cleaved into desired sizes, cleaned sequentially with methanol, ethanol, and deionized water, air-dried, and then exposed to repeated laser irradiations in the presence of air, $SF_6$ gas, or deionized water. For microstructuring in air or water, double-sided tape was used to fix the cleaned silicon wafer to the bottom of a Petri dish filled with ambient air or deionized water, respectively. For processing in $SF_6$ gas, a small vacuum chamber was assembled with a quartz window and a blank flange on two opposing arms of a four-way cross. The silicon wafer was attached to the inside wall of the blank flange. The chamber was pumped down to a base pressure of 0.01 Torr and backfilled with $SF_6$ gas to various pressures. A mode-locked frequency-tripled Nd:YAG laser with 355 nm wavelength and 22 ps pulse length (PL2143, EKSPLA, Vilnius, Lithuania) was operated at 2 Hz as the laser source for surface microstructuring. A UV grade fused silica lens (25.4 cm effective focal length, Thorlabs, Newton, N.J.) focused the laser beam through the quartz window onto the silicon target from a distance of ~20 cm, resulting in a ~1 mm diameter focal spot. Scanning electron microscopes (SEM) (LEO 1460VP, Carl Zeiss, Thornwood, N.Y., and FE-SEM S4700, Hitachi, Pleasanton, Calif.) were used to examine the surface morphology of the laser-processed spot. The SEM images were characterized with the UTHSCSA Image Tool program (V3.0, developed at the University of Texas Health Science Center, San Antonio, Tex.).

Mass Spectrometry.

The ionization threshold fluence measurement was carried out on a homebuilt linear time-of-flight (TOF) mass spectrometer. The detailed description of the instrument can be found elsewhere (Chen, Y.; Vertes, A. *J. Phys. Chem.* A 2003, 107, 9754-9761). Briefly, ions generated with a nitrogen laser of 337 nm wavelength and 4 ns pulse length (VSL-337ND, Laser Science Inc., Newton, Mass.) were accelerated to 25 kV and the ion current was recorded with a 1.5-GHz digital oscilloscope (LC684DXL, LeCroy, Chestnut Ridge, N.Y.). A variable attenuator (935-5-OPT, Newport, Fountain Valley, Calif.) was used to adjust the laser fluence. Actual laser fluence values were calculated from the laser pulse energy measured with a pyroelectric joule meter (Model J4-05, Molectron, Portland, Oreg.) and the laser focal area determined from the size of the burn mark on a photographic paper.

A curved field reflectron TOF mass spectrometer (AXIMA CFR, Shimadzu-Kratos, Manchester, UK) was used to collect the spectra at high resolution and sensitivity. In this system, the laser beam from a nitrogen laser was focused to a ~100 μm diameter area on the target. Laser energy could be tuned in the range of 0-180 measured in arbitrary units. All mass spectra shown in this report are the average of 100 laser shots acquired in reflectron mode, using 100 ns-delayed 2.5 kV extraction and a 20 kV acceleration voltage.

The silicon substrates were attached to the MALDI target plate with conductive double-sided carbon tape. Since the thickness of the silicon and carbon tape altered the electric field and flight length in the mass spectrometer, the system was recalibrated to provide correct mass assignments.

Results and Discussions

Preparation and Morphology of Silicon Microcolumn Arrays

Surface laser microstructuring was conducted on low resistivity silicon wafers with the ps laser. Preparation conditions, such as the processing environment and laser fluence, were varied to produce microcolumn arrays with the best LDI performance. Microstructuring in air and water environment was carried out at ambient conditions, whereas processing in $SF_6$ gas was conducted between 1 Torr and 1 atm pressure. Upon repeated laser exposure, the illuminated spot on the silicon wafer turned dark (less reflective) compared to the unexposed area. As the number of laser shots increased, this area finally became black, exhibiting a strong contrast to the unprocessed glossy polished silicon surface. In FIG. 1, SEM images demonstrate the surface morphology of the silicon wafers processed in the different environments.

FIG. 1A shows the silicon surface irradiated with ~1000 laser pulses at 1 J/cm² in ambient air. The laser shots caused deformation and structuring of the surface. The resulting ubiquitous protrusions were blunt and their distribution was irregular. The top view (left panel) shows that between the protrusions there are numerous small holes (diameter 3-4 μm), possibly resulting from the eruption of superheated subsurface silicon. In this phenomenon, known as phase explosion, subsurface vapor bubbles form when the surface layer melts and becomes transparent, and explode when they reach a critical size. The ensuing vigorous plume expansion at atmospheric pressure results in the rapid cooling and eventual collapse of the plume. In this process, most of the silicon vapor recondenses on the surrounding surface areas and the protrusions are formed.

Figure 1B:
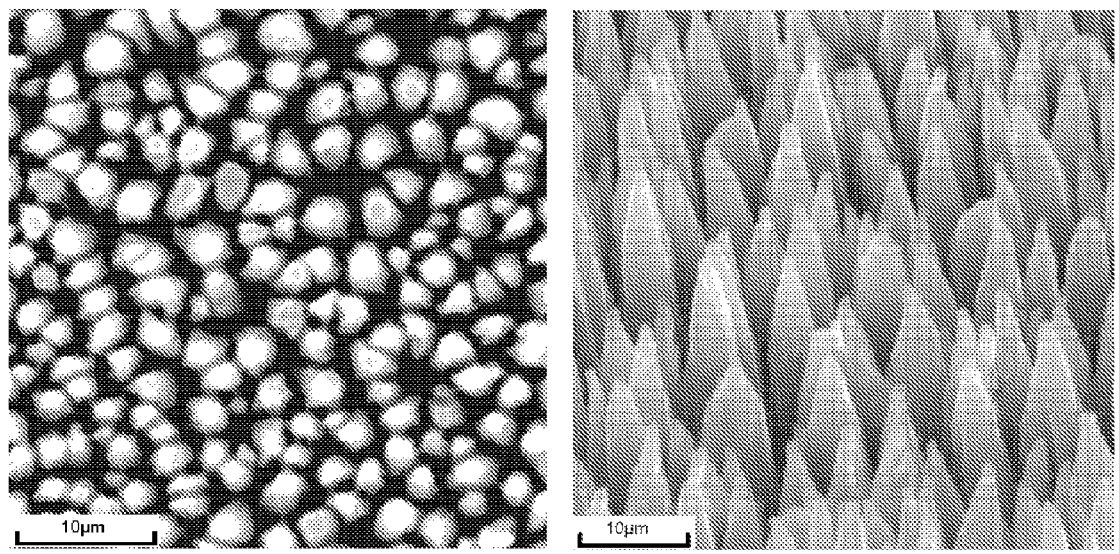

Applying 1200 laser pulses of 0.4 J/cm² fluence in 1 atm $SF_6$ gas environment produced sharp protrusions on the silicon surface, in the form of a quasiperiodic array of microspikes. FIG. 1B shows the top (left panel) and the side (right panel) views of the center portion of the array. There are four morphology parameters that characterize the arrays: the periodicity, the diameter and height of the spikes, and the radius of curvature at their tips. The density and size of the microspikes vary corresponding to the laser irradiance distribution across the profile, with thick, tall spikes in the middle, and fine, short ones at the rim. Assuming a $TEM_{00}$ laser beam profile enables us to calculate the local laser fluence, I(r), a particular r distance along the radius.

$$I(r) = \frac{2E}{\pi a^2} e^{\frac{2r^2}{a^2}}$$

where E is the laser energy and a is the radius where the intensity falls to $1/e^2$ or 13.5% of the intensity in the center. This means that the laser intensity drops by approximately a factor of ten going from the center to the perimeter of the focal spot. This change in laser intensity from the center to the rim corresponds to a 3.5 μm to 1.5 μm change in the periodicity, 0.75 μm to 0.5 μm reduction in the radius of tip curvature, and a 16 μm to 5 μm drop in the height of the microspikes.

Figure 1C:
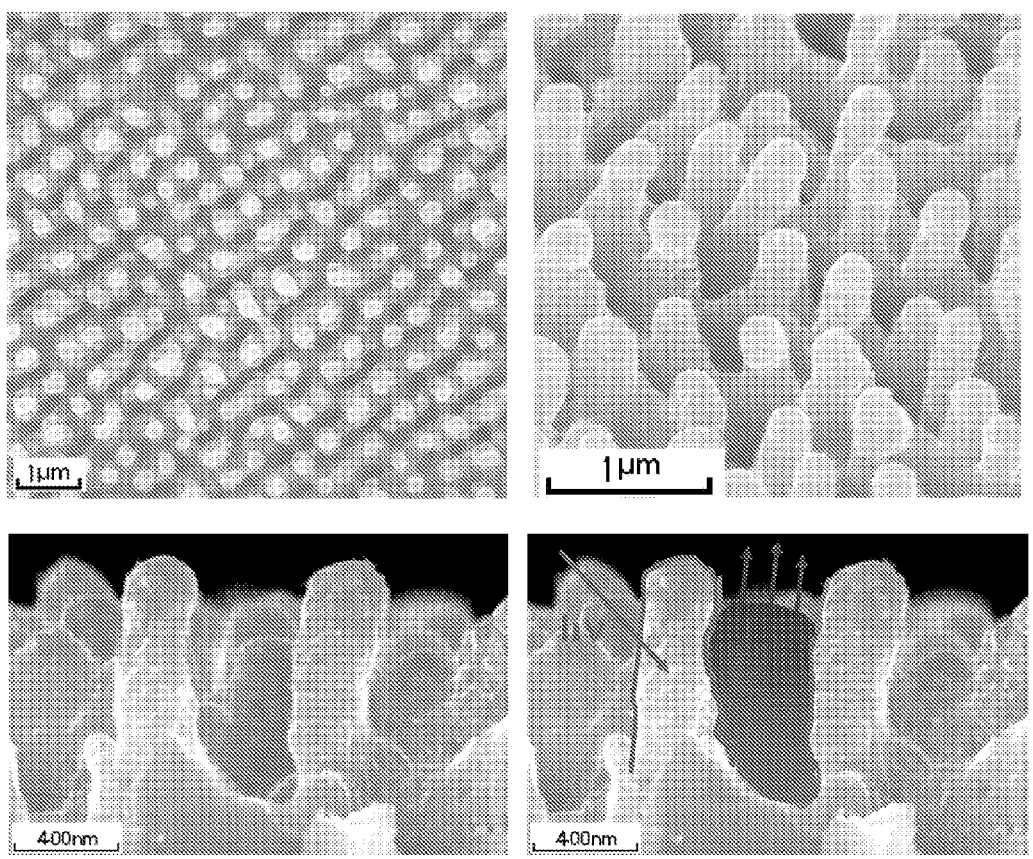

Arrays of sub-micrometer microcolumns were generated with 600 laser shots at 0.13 J/cm² in water environment, as shown in FIG. 1C. The microcolumns average 120 nm in the radius of tip curvature (bottom left panel), 600 nm in average periodicity (top left panel), and 800 nm in height (bottom left panel). The cross sectional view (bottom panels), show deep troughs between the submicron size columns. Unlike in the $SF_6$ gas environment, the size and distribution of the microcolumns produced in water are homogeneous across most of the laser spot. Comparing the side views of the columns for $SF_6$ (right panel in FIG. 1B) and water (top right panel in FIG. 1C), also indicates conical and cylindrical column morphologies, respectively.

It is proposed that these surface structures are the result of laser-induced silicon vaporization and recondensation. The initial laser irradiation causes local surface deformation in the form of capillary waves. Upon further laser exposure, the silicon vapor is preferentially redeposited at the tips of these structures, promoting axial growth and deepening the troughs and canyons. The sharp tips of the resulting microspikes in $SF_6$ gas are attributed to chemical etching by the laser-induced decomposition products from $SF_6$. The significantly finer structure in water may be attributed to the high thermal conductivity and heat capacity of water, which helps rapidly solidify silicon melt and limits the size of the protrusions.

The black color of laser-processed silicon indicates the close to unit absorptance from the near UV to near IR spectrum range. This enhanced absorption is due to the defect states in the band gap induced by the structural defect and impurities incorporated during laser ablation. The intrinsic absorptance is further increased by the multiple reflections within the array of microcolumns.

Fluence Dependence of Desorption Ionization

The three types of microstructured silicon substrates were attached to the solid insertion probe of the home-built MALDI-MS using conductive double-sided carbon tape. Stock solutions of substance P (1347.63 Da), angiotensin I (1296.48 Da), and bovine insulin (5733.49 Da) were prepared at ~0.5 nmol/µL concentration in 0.1% TFA solution. 1.0 µL of the analyte solutions was directly deposited and air-dried on the silicon substrates.

Protonated substance P signal was successfully detected on silicon microcolumn arrays produced in $SF_6$ and in water (data not shown). LISMA produced in water required ~30 mJ/cm$^2$ threshold laser fluence for ionization, similar to that required in MALDI experiments under similar conditions. Substrates generated in $SF_6$ gas required 70 mJ/cm$^2$ laser fluence. Silicon processed in air showed no ability to produce substance P signal. As a control experiment, substance P sample was deposited on unmodified silicon surface. No substance P ions were detected in the studied laser fluence range, and only very weak Na$^+$ and K$^+$ ion signal appeared at elevated fluence (90 mJ/cm$^2$). All studied polypeptides including bovine insulin could be detected on the LISMA produced in water, whereas only small peptides angotensin I and substance P appeared in the spectra from the substrates produced in $SF_6$ gas.

The correlation between the SLDI performance and the surface morphology can be associated with the variations of several factors, such as the surface area and confinement effects manifesting in, e.g., higher optical absorption and lower thermal conductivity. These factors were also considered significant in the DIOS method. For example, the heat conduction is inversely correlated with morphology, i.e., fine microcolumns have lower conductive thermal loss than the bulk material. Furthermore, nano-structured silicon has been reported to have a significantly reduced lattice thermal conductivity due to phonon confinement and boundary scattering. Thus, on the microcolumn arrays generated in water, the threshold temperature for desorption ionization can be reached at lower laser fluence than on the coarser structures.

Another important factor is the near-field effect in the vicinity of the microcolumns. The silicon microcolumns act like antennas and locally enhance the radiation field of the laser, thus reduce the fluence threshold.

Ionization yields can be affected by the presence of electrons in the laser plume due to photoelectric effects. Although the work function of pure <111> silicon surface is 4.83 eV, the microcolumn structure and the presence of the analyte on the surface can reduce this value perhaps even below the photon energy of the nitrogen laser (3.7 eV) used in the desorption experiments. Similar effects were observed in MALDI desorption from metal surfaces. In a delayed extraction experiment, during the initial field free period substantial electron density can develop. Depending on the experimental conditions, the interaction of these electrons with the laser plume can yield more (electron impact ionization) or less (recombination) positive ions.

Residual solvents retained in the cavities of the LISMA surface are the probable sources of protons that help to ionize peptides on the silicon substrate. Upon laser irradiation, the enhanced electric field and the photoelectron emission can significantly promote charge separation and ion formation from these solvent molecules.

SLDI at Low Fluences

Figure 2A:
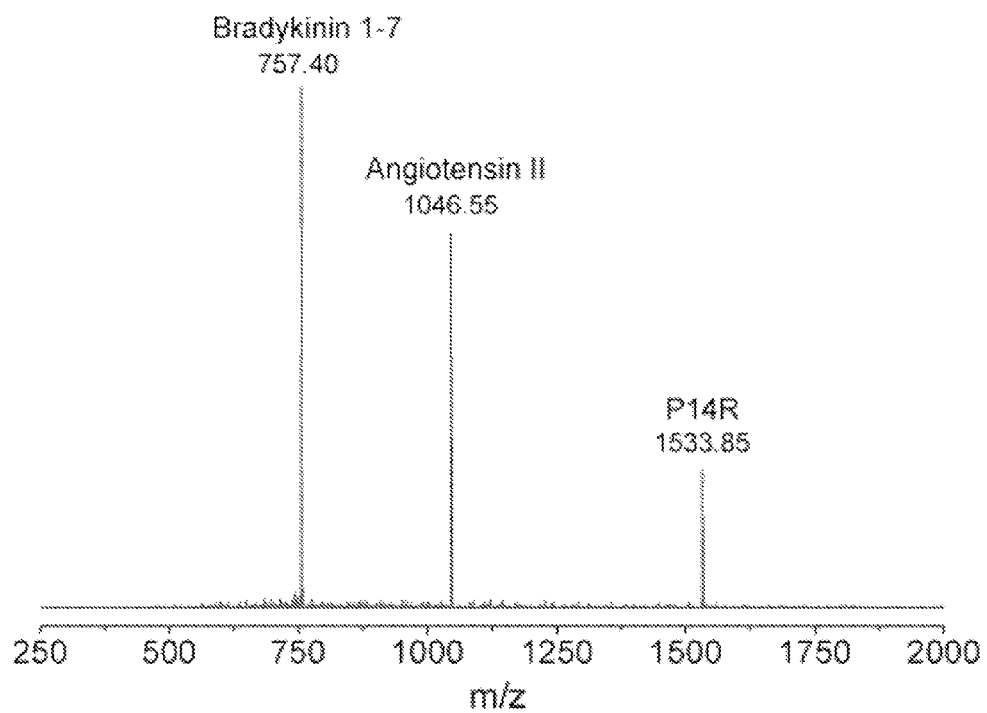

To further characterize the performance of the LISMA surface produced in water, data was collected on a Shimadzu-Kratos AXIMA CFR TOF mass spectrometer in the reflectron mode. Bradykinin fragment 1-7 (monoisotopic MW=756.39 Da), angiotensin II (MW=1045.53Da), and a synthetic peptide, pro14-arg (P14R, MW=1532.86 Da), from the MSCAL1 MALDIMS calibration kit were dissolved at 1 pmol/µl concentration in 0.1% TFA. 1 µl of this solution was applied on the LISMA substrate. Mass spectra were acquired at laser power 60 with a low-mass cutoff of 300 Da. As shown in FIG. 2A, all three peptides are protonated with no sign of alkali adduction or fragmentation. The relative laser power setting 60 was slightly above the ionization threshold for LISMA. This was lower than the necessary relative laser power of 65 and 80 we determined for the MALDI matrixes CHCA and DHB, respectively. As CHCA requires the lowest laser fluence among the commonly used matrixes, this confirms the utility of LISMA as an efficient SLDI method. In MALDI the labile synthetic peptide, P14R, tends to fragment at each proline residue forming a series of y-type ions. For this reason, P14R is commonly used as a calibration compound for metastable fragmentation in post-source decay (PSD) experiments. Notably, there is no sign of P14R fragmentation in FIG. 2A proving that at low fluences LISMA imparts negligible internal energy to the analyte. A detection limit of 10 fmol was determined based on the analysis of dilute P14R solutions.

Figure 2B:
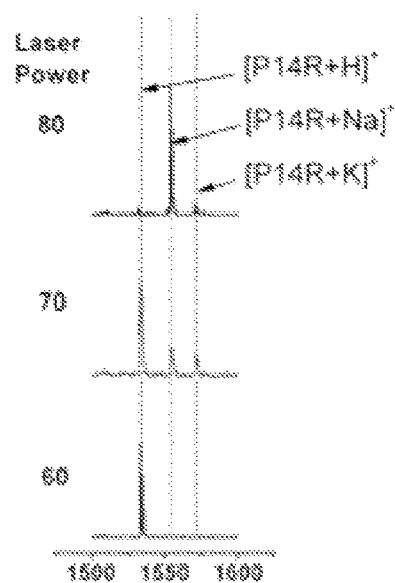

With the increase of laser fluence alkali adducts appeared in the spectra. FIG. 2B shows the redistribution of P14R quasi-molecular ions as the relative laser power increases from 60 to 80. At relative laser power 60, there were only protonated P14R molecules. With the relative laser power increased to 70, sodiated and potassiated P14R peaks also appeared. At relative laser power 80, the sodiated P14R became the dominant species whereas the abundance of the other two ions diminished.

Figure 3A:
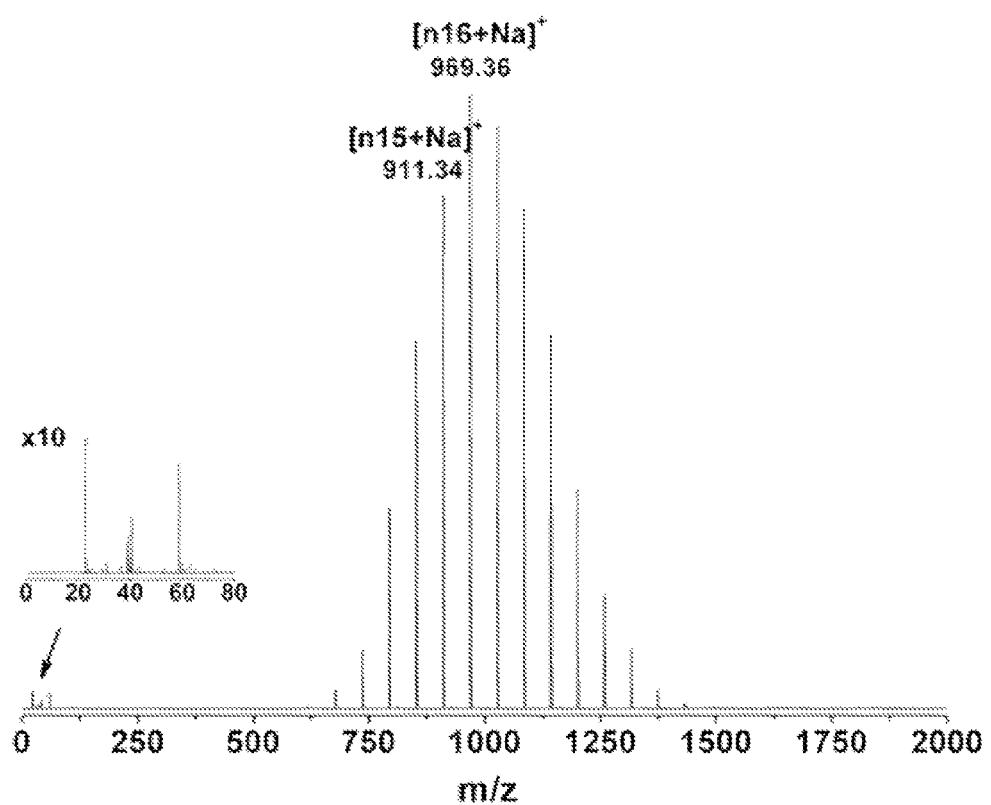
Figure 3B:
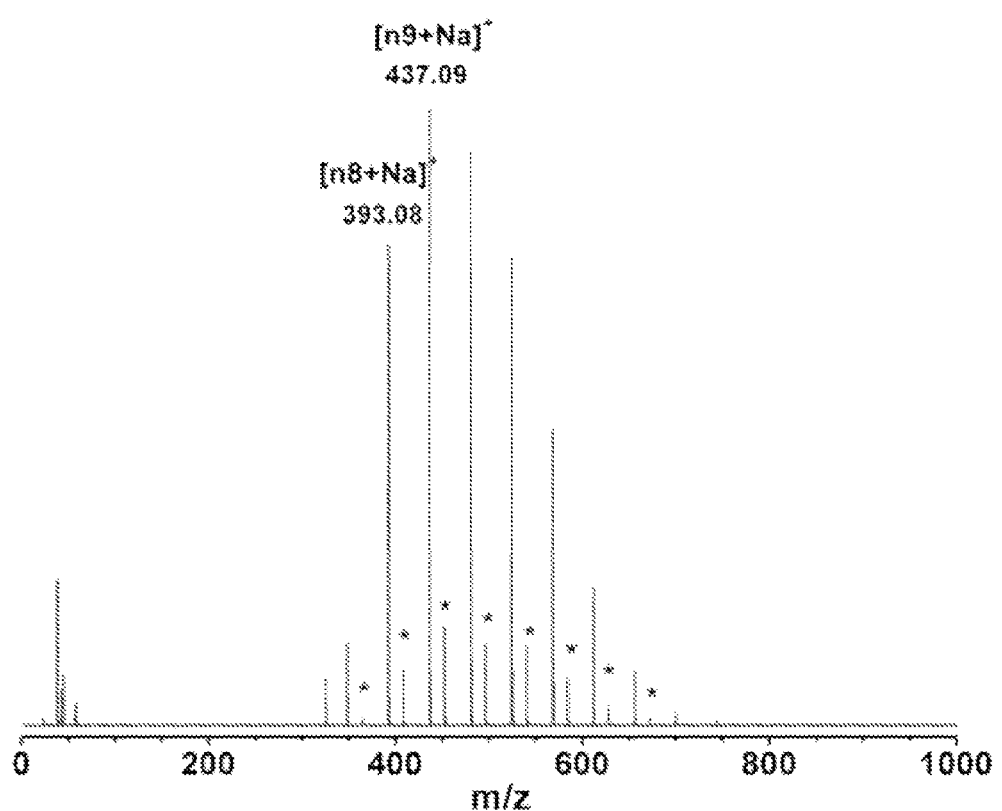

We also demonstrated that LISMA could desorb and ionize synthetic polymers. FIG. 3A shows the mass spectrum of 1 µl of 0.1 µg/µl PPG1000 in 0.1% TFA 30% methanol acquired in reflectron mode at a relative laser power of 135. Even though no sodium salt was added to the sample, exclusively sodiated PPG peaks appeared in the spectrum. The mass difference between neighboring peaks was 58 Da, reflecting the propylene glycol repeat unit. Other than the marginal signal from alkali and other metal ions in the <60 Da low-mass region (shown in the inset of FIG. 3A), there were no background peaks in the spectrum. FIG. 3B shows similar results obtained from 100 ng PEG400 at a relative laser power setting of 125. The major sodiated PEG oligomer peaks are accompanied by the potassiated PEG satellites.

Structure-Specific Fragmentation

Figure 4A:
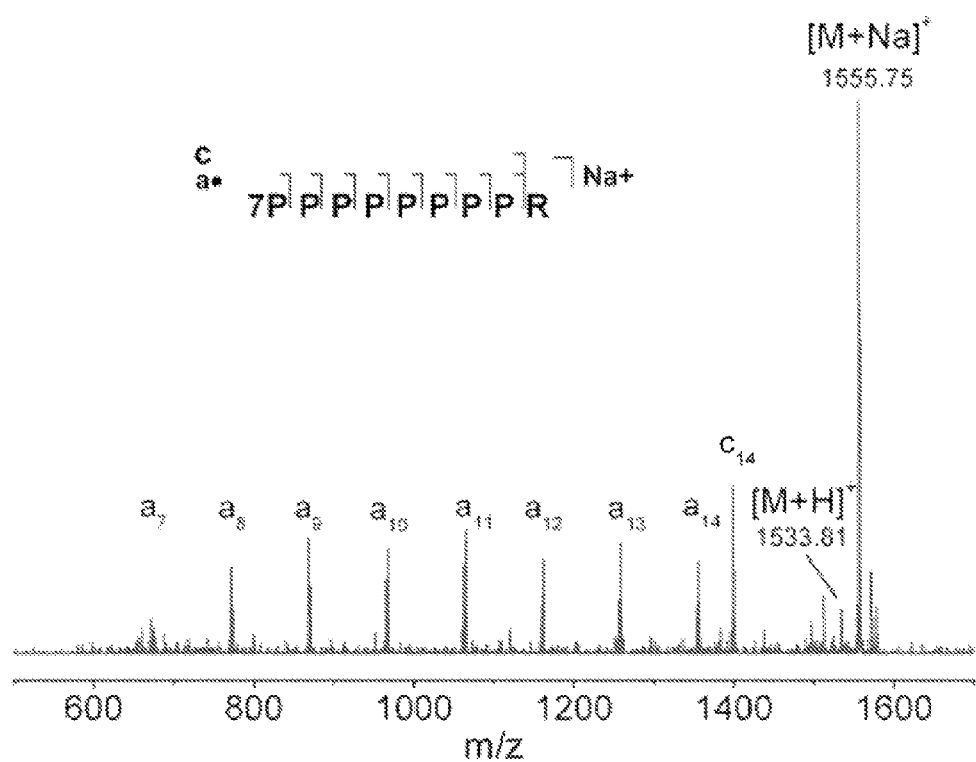
Figure 4B:
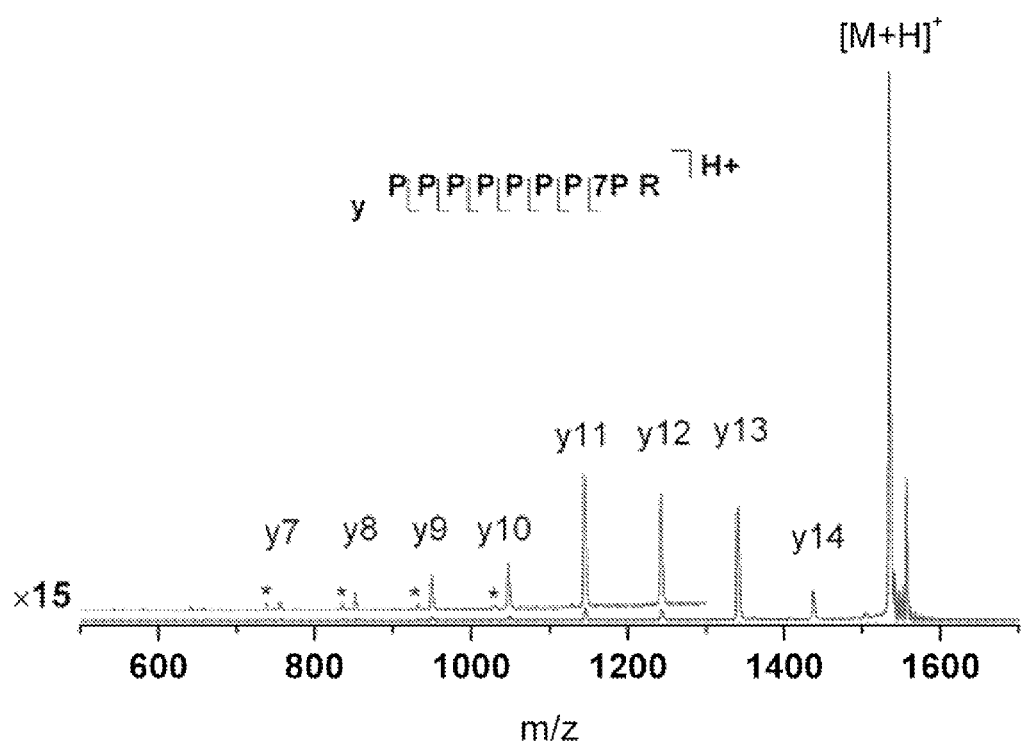
Figure 4C:
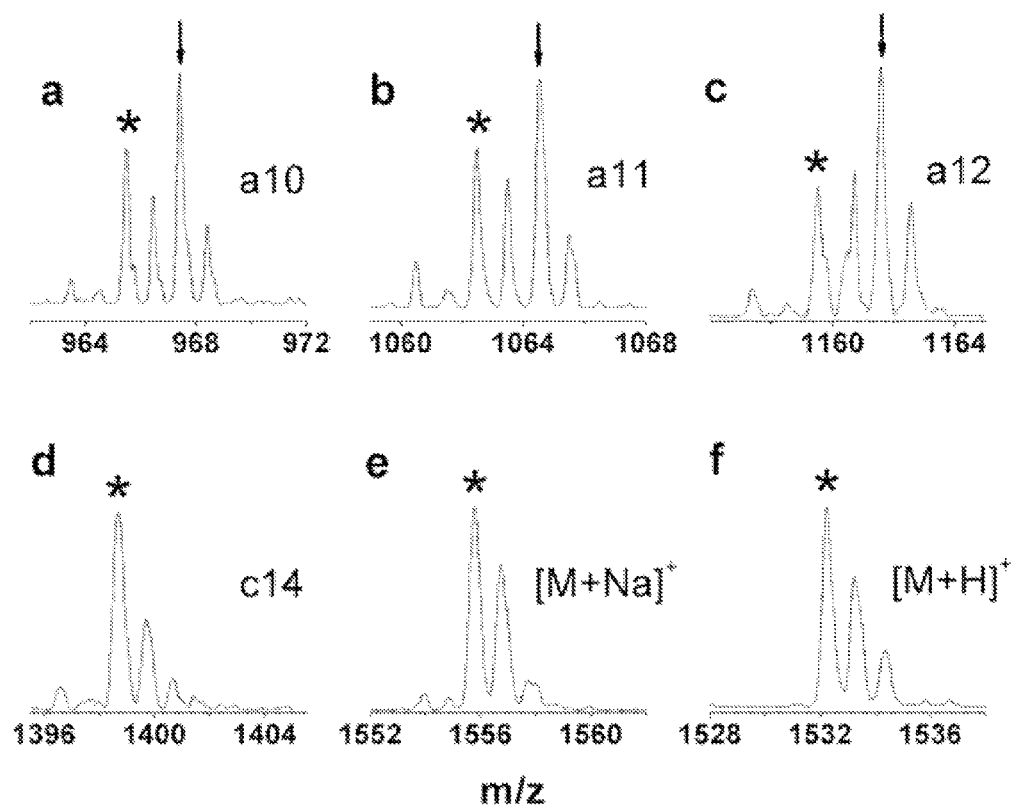

To assess the ability of LISMA surfaces to induce structure-specific peptide fragmentation, P14R spectra were recorded as a function of laser fluence. Fragmentation of the P14R started when the relative laser power exceeded 75 arbitrary units. FIG. 4A shows the spectrum acquired from 1 pmol of P14R at a relative laser power of 85 in the reflectron mode with the PSD ion gate disabled. For comparison, FIG. 4B shows the MALDI PSD spectrum of 1 pmol P14R 12 desorbed from CHCA matrix at a relative laser power of 100. Typically for PSD in MALDI, the fragment ions were mostly y-type species and their derivatives due to $NH_3$ loss; they were only moderately well focused; and their intensity deteriorated with the loss of just a few residues. In contrast, the peptide fragments from the LISMA surface were mostly sodiated N-terminal ions. Losing the arginine residue produced c14 ions, and sequential proline loss resulted in a series of a-type ions. Compared to the parent species, most fragment ions exhibited significant abundance. The isotope distributions in FIG. 4C shows that all fragment ions are well focused throughout the mass range. This indicated that the fragment ions formed instantaneously in the acceleration region, i.e., these ions were produced by in-source decay (ISD). At 85 relative laser power, the most prominent quasi-molecular ion was the sodiated P14R (see panel (e) in FIG. 4C), whereas the protonated P14R peak was marginal.

Although in peptide mapping ISD is avoided, in the top-down sequencing approach it can be very useful in determining the primary structure of peptides. As MALDI is a soft ionization method, the quasi-molecular ions gain only a limited amount of internal energy during ionization. Thus, ISD in MALDI is very inefficient and the peptides undergo metastable fragmentation past the source region (PSD) instead. As we demonstrate in FIG. 4A, at elevated laser power, LISMA can efficiently promote ISD and provide structural information complementary to other peptide sequencing methods. In contrast, at low laser power, LISMA provides molecular weight information for the analysis of intact peptides even as labile as P14R (see FIG. 2A). The mechanism behind the versatility of LISMA substrates is unclear, but we believe it can be attributed to the unique properties of the silicon microcolumn structure and possibly to confinement effects. The various factors affecting SLDI from LISMA are discussed below.

(1) Increased Surface Area

Laser structuring of the silicon surface results in an increased surface area. Based on FIG. 1C, we can approximate the shape of the microcolumns produced in water by cylinders with a hemispherical cap. Their diameter, height and periodicity are 240 nm, 800 nm and 600 nm, respectively. The calculated new surface area is only three times larger than the original flat surface. Similarly, the microcolumns produced in $SF_6$ can be approximated as closely packed cones (FIG. 1B). Their height and periodicity are 10.5 μm and 3 μm, respectively. Thus, compared to the original polished wafer, the surface area increases only by a factor of six. As the LISMA produced in water is much more efficient in ion production than the structure formed in $SF_6$, these estimates indicate that the ion production from these surfaces is not the result of their increased area.

(2) Surface Chemistry Due to Preparation Conditions

The three different preparation environments, air, $SF_6$ and water, result in chemically different surfaces. Although the true nature of these surfaces can only be determined by detailed analysis, one expects that air as a background gas results in a partially oxidized surface, whereas water promotes the formation of OH terminated sites. In the presence of $SF_6$ during femtosecond laser processing, incorporation of both sulfur (~1000 ppm) and fluorine (~10 ppm) into the surface layer of LISMA was detected by secondary ion mass spectrometry. Thus, the three processing environments leave the silicon surface in different chemical states. Further studies are required to understand the effect of the surface composition on the SLDI process.

(3) Thermal Confinement in LISMA

Formation of the microcolumns results in high aspect ratio submicron structures that exhibit the confinement of the energy deposited by the laser pulse. Dissipation of this energy through heat conduction is limited to the column axial direction, which results in the rapid rise of surface temperatures in these structures at relatively low fluences.

In MALDI primarily the matrix molecules absorb the laser energy. During laser irradiation and at the very early stage of plume expansion, the analyte molecules might experience a temperature higher than the sublimation temperature of the matrix molecules (ranging from 400-600 K), but further plume expansion and collisions rapidly decrease the plume temperature. The energy transfer between the matrix and analyte is also limited by an energy transfer bottleneck.

Silicon, however, has a melting point of over 1600 K and a sublimation temperature above 2800 K. Although the temperature may not reach sublimation point, in SLDI on LISMA—as explained above—the surface temperature rises rapidly due to thermal confinement in the submicron structure. Furthermore, since it is a matrix-less desorption method, the plume is less dense than in MALDI and the expansion cooling is negligible. At elevated laser fluence, the analyte molecules can acquire a significant amount of internal energy and undergo unimolecular decomposition.

(4) Optical Properties of LISMA

Compared to bulk silicon, the altered chemical composition of the microcolumns results in enhanced optical absorption. The absorptance values are increased across the entire UV-visible spectrum and significant absorption extends into the near-IR region, beyond the absorption edge defined by the band gap of bulk silicon. Additional energy deposition is observed due to the presence of multiple scattering on the column arrays. Stronger optical absorption in combination with thermal confinement results in high surface temperatures at relatively low laser fluences (5) Reactions in Confined Plume There are important consequences of the structured surface for the formation and dissipation of the plume. Compared to the original flat silicon surface, the troughs of the LISMA structure retain the laser plume at a higher density for a longer period of time. The bottom right panel of FIG. 1C shows this scenario. As the columns heat up due to the laser radiation, the adjacent trough with submicron dimensions fills up with desorbed species. Assuming that the plume expands with ~300 m/s linear velocity, this takes approximately ~1 ns. The dissipation of the plume from this confined volume takes place through the evacuation of the troughs. This process is limited by the reduced pumping speed within the LISMA structure. During the time the plume is retained, the in-plume reactions are enhanced. This effect is proportional to the plume density that, in turn, is a function of the laser fluence. As it is shown in the next subsection, higher laser intensity can result in the buildup of significant alkali ion and electron density in the plume and, as a consequence, in the appearance of new ionic species in the spectrum.

(6) Electron Emission and Fragmentation

In field free MALDI experiments, electron emission from the stainless steel desorption substrate was observed. Under the influence of nanosecond laser radiation, silicon surfaces are also known to emit electrons. At fluences below melting, the photoelectric effect induces electron emission for low fluences (30 mJ/cm$^2$), whereas thermionic emission of electrons dominates at higher fluences (80 mJ/cm$^2$). Due to the modified surface composition of LISMA, these mechanisms can be significantly altered. There is, however, no information available on electron emission from the LISMA surfaces. In the following discussion we assume that at least some electrons are emitted in delayed extraction experiments, where during the first ~100 ns after the laser pulse there is no external electric field. In continuous extraction experiments the electron emission is suppressed by the reverse electric bias on the surface.

In the early phase of plume formation these emitted electrons interact with the surface and mix with the plume of desorbed species including analytes, residual solvents and products from other surface impurities (e.g., silanol groups). At low fluences protons can originate from the electron induced ionization of these components either on the surface or in the plume and subsequent ion-molecule reactions can lead to protonated species. At increased laser power, the elevated electron density can neutralize the protons to form hydrogen free radicals (H·). Simultaneously, more alkali ions are released from the hot silicon surface that results in peptide-alkali adduct ion formation. In FIG. 4C, panels (f) and (e) show the change of P14R molecular ions from protonated at low fluence (f) to sodiated at higher laser intensity (e).

The presence of H· in the plume can explain the onset of ISD and the formation of the fragmentation ladder observed in FIG. 4A. It is known that in MALDI hydrogen atoms resulting from matrix photochemical reactions induce ISD. The mechanism was deemed similar to the hydrogen atom attachment previously proposed to explain fragmentation in electron-capture dissociation (ECD) of multiply charged ions. Even though there are no matrix molecules involved, in SLDI from LISMA hydrogen free radicals can mediate ISD of singly charged peptide ions resulting in fragments similar to those in ECD.

Eqs. 1 and 2 illustrate the fragmentation pathways that P14R can follow after a hydrogen radical attack. The precursors are sodiated ions, and the charge can go to either fragment product. Eq. 1 shows that, upon hydrogen atom attachment to the carbonyl group, the parent ion dissociates to form c and z· fragments. Due to the cyclic structure of proline, N—C bond breakage is hindered. The arginine is the only residue on the C-terminal that can break away as the free radical z fragment. This corresponds to the peak c14, the only c type ion, in FIG. 4A. Eq. 2 shows that when the hydrogen atom attaches to the amine group the P14R dissociates into free radical, $a_n$·, and y segments. In eq. 3, the $a_n$· continues the fast free radical fragmentation by sequentially losing carbonyl and 3,4-dihydro-2H-pyrrole, resulting in a series of a-type ions as it is seen in the spectrum (FIG. 4A).

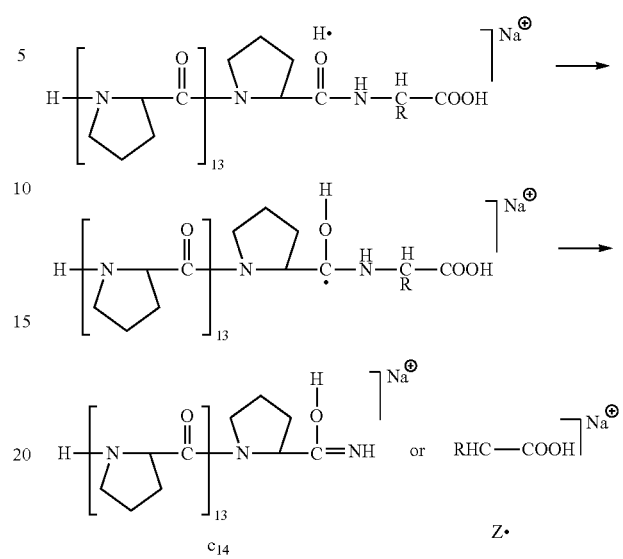

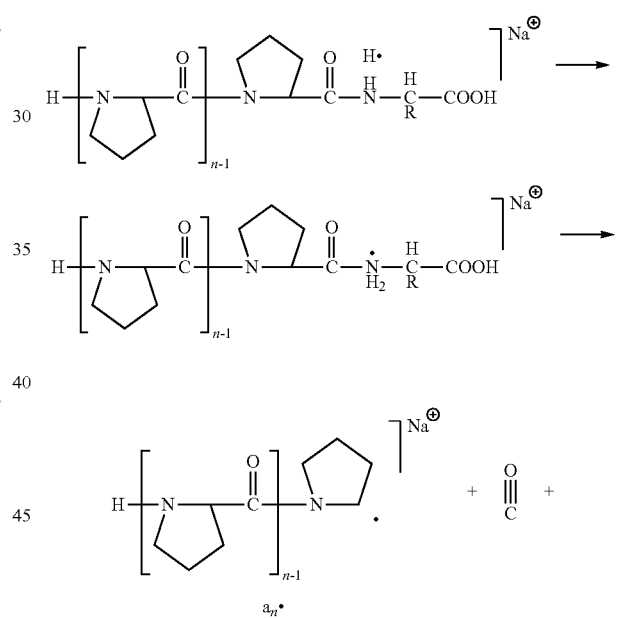

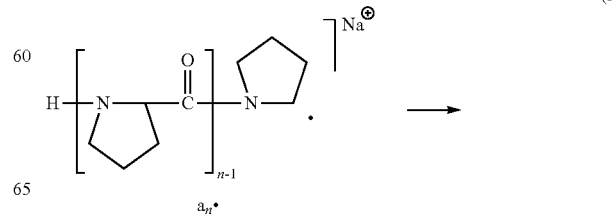

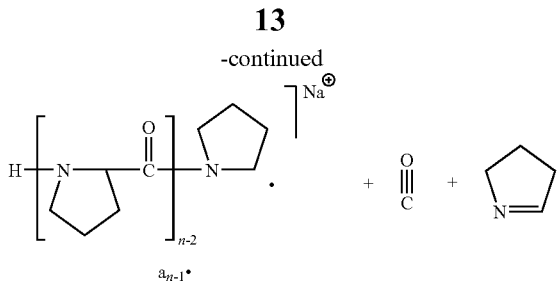

Further proof of hydrogen atom attachment can be found in FIG. 4C. Panels (a) to (e) show the isotope profiles of P14R fragment ions a10, a11, a12, c14 and the [M+Na]$^+$ quasi-molecular at relative laser power 85, respectively. For reference, the isotope distribution of the protonated molecular ion, [M+H]$^+$, acquired at relative laser power 60 is displayed in panel (f). The asterisk marks the monoisotopic peak in each profile. Compared to the profiles of c14 and the molecular ions, the profiles of the a-type ions show a clear departure from their natural isotope distributions. In these spectra, the peak at two mass units above the monoisotopic species becomes the most abundant peak in the isotope profile. We attributed this to the appearance of [a$_n$+2H+Na]$^+$ ions (marked by the vertical arrows) formed by the attachment of two hydrogen radicals.

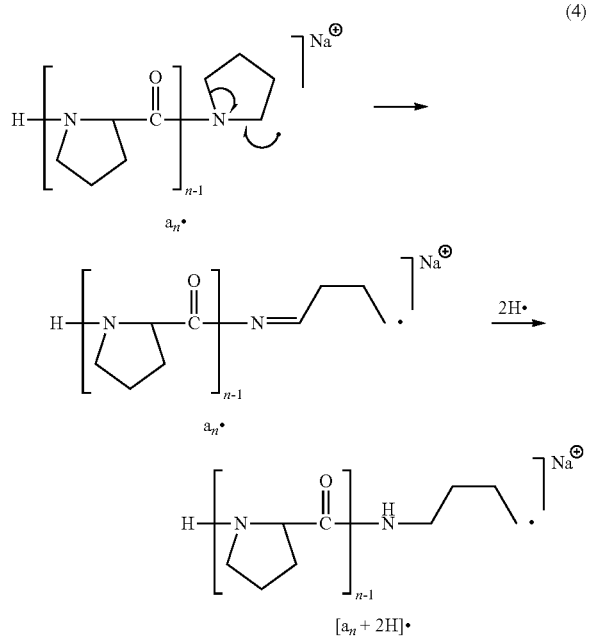

(4)

This process is described in eq. 4, where some a-type radical cations rearrange, break the cyclic structure and react with two additional hydrogen atoms.

In this section we demonstrated that at high laser power excess electrons contributed to hydrogen radical formation via proton/electron neutralization. These radicals promoted the ISD of peptides on the LISMA surface, giving structural information similar to ECD for de novo peptide sequencing.

CONCLUSIONS

Microcolumn arrays of laser processed silicon were shown to be effective as SLDI substrates for the mass spectrometric analysis of peptides and synthetic polymers. The desorption ionization threshold fluence and efficiency were strongly dependent on the surface morphology that was determined by the medium used in microstructuring. LISMA was capable of desorbing and ionizing peptides of up to 6000 Da molecular mass and exhibited low femtomole detection limits. Depending on the laser power, LISMA behaved as a SLDI substrate for intact peptide analysis (low fluence) or produced structure-specific ions through ISD for top-down peptide sequencing (high fluence). The mechanism of ion formation under these conditions was attributed to the thermal, optical and electron emission properties of the silicon microcolumns as well as to thermal and chemical confinement effects.

This new matrix-free SLDI substrate offers several advantages over existing systems. LISMA is more versatile than DIOS in the sense that varying the laser fluence enables interchanging between molecular ion detection and structure-specific fragmentation. It is more robust than silicon nanowires as excessive laser exposure does not destroy the structure. In principle, the LISMA surface is reusable and can even be regenerated by further laser processing.

The analytical figures of merit for LISMA surfaces are less broadly tested than in the case of DIOS. We expect that the chemical modification of the microcolumn arrays, e.g., with silylation reagents, can not only change the surface chemical properties but also fine-tune the thermal and optical/electronic properties.

We also showed that the mechanism of ISD on LISMA resembles that of ECD. In this mechanism the hydrogen free radicals attach to the amino and carbonyl groups and disrupt the peptide backbone while the labile post-translational modifications are preserved. We expect that similar to ECD, the cleavage sites should have little selectivity for particular amino acid residues. Further characterization of the broad ISD performance of LISMA is underway.

Example

Lisma Surfaces (a) Materials

Angiotensin I, substance P, bovine insulin, ethanol, methanol and 2,5-dihydroxybenzoic acid (DHB) were obtained from Sigma Chemical Co. (St. Louis, Mo.). Reagent grade trifluoroacetic acid (TFA) was obtained from Aldrich (Milwaukee, Wis.). Stock solutions of the peptides were prepared at $10^{-3}$ M concentration in 0.1% TFA and diluted to $10^{-5}$ M for the SLDI experiments. The sulfur hexafluoride gas (SF$_6$) used in silicon wafer processing was obtained from Spectra Gases, Inc. (Branchburg, N.J.). Acetonitrile solvent (HPLC grade) was purchased from Fisher Scientific (Springfield, N.J.). Deionized water (18.2 MΩ×cm, produced by a D4631 E-pure system, Barnstead, Dubuque, Iowa) was used for the preparation of various solutions and for the laser processing of silicon wafers. All chemicals were used without further purification.

(b) Preparation of LISMA Surfaces

Earlier approaches to produce LISMA surfaces were based on nanosecond and femtosecond laser irradiation with the latter focused on the visible spectral range. It was noted that increasing the pulse length from 100 fs to 10 ps resulted in more dense spike arrays and at 250 ps the spikes disappeared altogether. In our work, a 22 ps mode-locked 3×Nd:YAG laser was used at 355 nm for processing. Both positively (Si:B <100>) and negatively (Si:As <100>) doped, low resistivity (~0.001-0.005Ω·cm) silicon wafers (University Wafer, South Boston, Mass.) were irradiated in air, SF$_6$ gas or deionized water. The wafers were cleaved to the desired size, cleaned sequentially with methanol and ethanol and finally air-dried. For processing, the clean silicon wafer was attached to the bottom of a Petri dish with double-sided tape and exposed to laser radiation in air or in deionized water. To produce the microstructures in $SF_6$, the silicon wafer was placed in a small vacuum chamber that was evacuated to $1 \times 10^{-2}$ Torr and backfilled with $SF_6$ gas to various pressures (1 to 500 Torr). The laser beam was focused to a ~1 mm diameter spot to produce 0.4-1.0 $J/cm^2$ fluence.

(c) Surface Morphology

A scanning electron microscope (SEM) (LEO 1460VP, Carl Zeiss, Thornwood, N.Y.) was used to examine the produced micro and nanostructures.

Depending on the laser pulse energy, the focusing conditions and the environment, various morphologies were revealed by the SEM images. The wafer processed in ambient air with a 1000 shots of 7 mJ laser pulses exhibited deformations on its surface resulting in ubiquitous blunt protrusions. Among the protrusions, there were numerous holes that might have resulted from the burst of bubbles formed in an overheated subsurface silicon layer. At relatively low pressure (10 Torr), the $SF_6$ gas environment produced sharper and more regular protrusions on the surface resulting in arrays of spikes (see the right panel in FIG. 1B). These features were 1-3 µm in diameter at the tip and measured 10-20 µm in height. The density and size of the spikes varied with the laser intensity distribution across the beam, with coarse, tall spikes in the center, and fine, short ones at the rim. In water, the spikes were less than 500 nm in diameter at the tips and less than 3 µm in height. The significantly finer structure might be attributed to the fast solidification of molten silicon due to the high thermal conductivity and high heat capacity of water.

(d) Laser Desorption Experiments

A home-built linear time-of-flight (TOF) mass spectrometer was used for these laser desorption studies. The detailed description of the instrument can be found in the literature. Briefly, ions generated with a 4 ns pulse length nitrogen laser at 337 nm (VSL-337ND, Laser Science Inc., Newton, Mass.) were accelerated to 25 keV and their flight time was recorded with a 1.5-GHz digital oscilloscope (LC684DXL, LeCroy, Chestnut Ridge, N.Y.). A variable altenuator (935-5-OPT, Newport, Fountain Valley, Calif.) was used to adjust the laser fluence. Laser energy was measured with a pyroelectric joule meter (Model J4-05, Molectron, Portland, Oreg.) and displayed by an energy meter (Energy Max 400, Molectron) The focal area of the laser beam was determined by measuring the burn mark on a photographic paper. For the SLDI experiments, 0.5 to 1.0 µl of the $10^{-5}$ M analyte solution analyte was deposited on the studied surface and air dried before spectrum collection.

(e) LDI from LISMA Surfaces

Peptides and peptide mixtures were used in the SLDI experiments utilizing the LISMA surfaces described above as desorption surfaces. The spectra of various peptides indicated predominantly protonated ions up to m/z ~6000. The submicron tip diameter microcolumn arrays produced in water demonstrated the highest ion yields. The threshold fluence at ~30 $mJ/cm^2$ was comparable to values observed in MALDI. FIG. 5 shows the SLDI spectrum of a three-component peptide mixture containing angiotensin I, substance P and insulin.

FIG. 8 is an SLDI mas spectrum of a peptide mixture containing angiotensin I, substance P and insulin from a LISMA surface.

Although other silicon nanostructures, such as nanopores and nanowires, are also used to produce peptide ions in SLDI experiments, the LISMA surfaces are significantly simpler to produce and can be more readily integrated into microchemical chips. Due to the uniform light absorption characteristics of the surface from near UV to mid IR, it is expected that a wide variety of lasers can be used for SLDI experiments.

Our earlier SLDI studies on 40-nm diameter and ~1-µm long silicon nanowires with 10-50 wires/µm² surface density indicated very low (0.3 µJ/pulse) laser pulse energy requirements for ion production. However, SEM studies on these surfaces revealed that the exposure of these quasi-one dimensional structures even to this extremely low laser radiation resulted in the evaporation of all the exposed nanowires. Thus, SLDI spectrum collection from a particular spot destroyed the surface and resulted in increasingly poor shot-to-shot reproducibility.

The SLDI procedures reported here for silicon microcolumn arrays were not optimized to give the highest ion yields. After processing, the surface of the LISMA surface was left in its native state. Thus, depending on the environment and ablation conditions, a varying degree of surface oxidation with a certain density of hydroxide groups was present. Further improvements are expected from refinements in surface preparation, including the optimization of laser processing conditions and the derivatization of the processed silicon surface. For example, to modify the wetting properties and the surface adsorbate interaction energies, the microcolumn arrays can be silylated.

Picosecond laser microstructuring of silicon resulted in a robust surface also capable of SLDI for peptide mixtures. These silicon surfaces were simple to produce and offered a great variety of potential chemical modifications. Although compared to silicon nanowires the threshold laser pulse energy for ionization was significantly (~10×) higher, the ease of production and robustness of microcolumn arrays offered complementary benefits.

Silicon microcolumn arrays can be produced with a wide spectrum of morphologies by varying the aspect ratio, the density and the tip diameter of the columns. The column surfaces can be derivatized to alter their wetting properties and the interaction energy between the adsorbate and the surface.

Protein Analysis Platform

It is contemplated that silicon wafers prepared according to the inventive technology herein and/or having the physical properties describe herein, are integrated into microfluidic protein analysis platforms. It would be expected to provide a significant advantage Polymers Synthetic polymers are useful in everyday life and are ubiquitous in products ranging from automobile components to drug delivery devices. For example, poly(ethylene glycol) in pharmaceuticals and polystyrene in major household appliances, contact lenses, fabrics, and housewares are based on synthetic polymers. Different polymer formulations possess unique chemical, physical, and mechanical properties. Small variations in the structure of a given polymer formulation, such as oligomer size distributions or additives, can significantly change its characteristics, resulting in new functions and applications. For example, polyvinyl alcohol is a water-soluble synthetic polymer made by alcoholysis of polyvinyl acetate. Its chemical and physical properties depend on the degree of polymerization and the percentage of alcoholysis.

Water solubility increases as molecular weight decreases; however, properties such as viscosity, strength, and flexibility improve with increasing molecular weight. Therefore, it is important to control and monitor the parameters that affect the final properties during the development and manufacture of polymers for specific applications. Based on the results shown in FIG. 3, it is expected that submicron laser patterned surfaces would be used in such methods.

Pharmaceuticals

Purity of pharmaceuticals has been increasingly determined using thin layer chromatography (TLC) in combination with MALDI-MS. Our results indicate that silicon wafer or other submicron laser patterned surfaces prepared according to the processes herein can be used in methods and systems for testing compounds all along the pharmaceutical research and development pipeline.

It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

What is claimed is:

1. A method of detecting a sample, comprising:
subjecting the sample to LDI-MS,
wherein the sample is selected from the group consisting of proteins, peptides, pharmaceuticals, explosives, synthetic polymers, and molecules having a molecular weight less than about 6000 Daltons, and wherein the LDI-MS is performed using a LDI-MS device which comprises a laser patterned surface,
wherein the laser patterned surface is prepared by subjecting a silicon surface, in liquid, to repeated pulsed high-power laser irradiation selected from picosecond laser irradiation and femtosecond laser irradiation,
wherein an array of microcolumns are generated on the silicon surface and the microcolumns have average structural features of less than 10 micrometers in size, wherein the average structural features are selected from column height, diameter and periodicity,
wherein the sample is subjected to LDI-MS at a laser fluence of at least about 30 $mJ/cm^2$.

2. The method of claim 1, wherein the sample is a peptide or organic molecule sample, and wherein the peptide or organic molecule sample is subjected to LDIMS and provides molecular weight data about the peptide or organic molecule sample.

3. The method of claim 1, wherein the sample is a peptide or organic molecule sample, and wherein the peptide or organic molecule sample is subjected to LDIMS at high laser power, and wherein the high laser power generates peptide or organic molecule fragment ions that provide structural information for peptide sequencing or organic molecule structure determination.

4. The method of claim 1, wherein the wafer surface is chemically modified.

5. The method of claim 1, wherein the wafer surface is chemically modified by a silylation reagent.

6. The method of claim 1, wherein the microcolumns have average structural features of less than 1 micrometer in size.

7. The method of claim 1, wherein the liquid is water.

8. The method of claim 1, wherein the laser patterned surface is integrated in a micro-chemical chip.

* * * * *